(12) United States Patent
Nettleton et al.

(10) Patent No.: US 8,494,024 B1
(45) Date of Patent: Jul. 23, 2013

(54) BEAM QUALITY OF THE MONOBLOCK LASER THROUGH USE OF A 1.5 MICRON EXTERNAL CAVITY PARTIAL REFLECTOR

(71) Applicant: United States of Ameerica, as represented by the Secretary of the Army, Washington, DC (US)

(72) Inventors: John E. Nettleton, Fairfax Station, VA (US); Lew Goldberg, Fairfax, VA (US); Dallas N. Barr, Woodbridge, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/629,758

(22) Filed: Sep. 28, 2012

Related U.S. Application Data

(62) Division of application No. 12/848,272, filed on Aug. 2, 2010, now Pat. No. 8,306,074.

(51) Int. Cl.
*H01S 3/08* (2006.01)
*H01S 3/06* (2006.01)
*H01S 3/113* (2006.01)
*H01S 3/082* (2006.01)
*H01S 3/108* (2006.01)

(52) U.S. Cl.
CPC .............. *H01S 3/0625* (2013.01); *H01S 3/082* (2013.01); *H01S 3/0621* (2013.01); *H01S 3/113* (2013.01); *H01S 3/1083* (2013.01)
USPC .............. 372/99; 372/98; 372/97; 372/95; 372/41; 372/18; 372/10

(58) Field of Classification Search
CPC ......... H01S 3/0625; H01S 3/082; H01S 3/113; H01S 3/0621; H01S 3/1083
USPC .......................... 372/99, 98, 97, 95, 10, 18, 41
See application file for complete search history.

(56) References Cited

U.S. PATENT DOCUMENTS

| | | | |
|---|---|---|---|
| 7,039,087 B2 | 5/2006 | Nettleton et al. | |
| 7,839,904 B1 * | 11/2010 | Equall et al. | 372/10 |
| 2006/0171429 A1 * | 8/2006 | Seitel | 372/10 |
| 2006/0280221 A1 * | 12/2006 | Seitel | 372/100 |

OTHER PUBLICATIONS http://www.shanghai-optics.com/product/product_optical_OPO.php.

* cited by examiner

*Primary Examiner* — Kinam Park
(74) *Attorney, Agent, or Firm* — Richard J. Kim

(57) ABSTRACT

A monoblock laser cavity incorporates optical components for a short-pulse laser. These optical components are 'locked' into alignment forming an optical laser cavity for flash lamp or diode laser pumping. The optical laser cavity does not need optical alignment after it is fabricated, increasing the brightness of the monoblock laser.

6 Claims, 3 Drawing Sheets

BEAM QUALITY OF THE MONOBLOCK LASER THROUGH USE OF A 1.5 MICRON EXTERNAL CAVITY PARTIAL REFLECTOR

REFERENCE TO RELATED APPLICATIONS

This is a divisional patent application of copending application Ser. No. 12/848,272, filed Aug. 2, 2010, entitled "Beam Quality of the Monoblock Laser Through Use of a 1.5 Micron External Cavity Partial Reflector." The aforementioned application is hereby incorporated herein by reference.

GOVERNMENT INTEREST

The invention described herein may be manufactured, used, sold, imported, and/or licensed by or for the Government of the United States of America.

FIELD OF THE DISCLOSURE

The disclosure relates to a monoblock laser cavity having optical components for a short-pulse laser.

BACKGROUND INFORMATION

Laser range finders are an increasingly vital component in high precision targeting engagements. The precise and accurate range to target information is an essential variable for fire control of weapons. This information is easily, and timely, provided by laser range finders.

Unfortunately, known laser range finders are bulky, heavy and expensive. These laser range finders were not developed with the individual field use in mind.

Monoblock laser makes the development/fabrication of a very low cost, compact laser range finder feasible. Unfortunately, the beam divergence of known monoblock lasers is rather large (typically between 8 and 14 mRad). Such a laser has a fairly low brightness, wherein a sizable optic is needed to collimate the monoblock laser output.

SUMMARY

A monoblock laser cavity having optical components is disclosed for a short-pulse laser. One exemplary embodiment of a monoblock laser cavity includes a gain medium having one coated end surface, a juncture in the medium, and another end surface; a passive Q-switch having one end surface optically facing said another end surface of the gain medium; and an optical parametric oscillator crystal having one end surface and an output face. The one end surface of the optical parametric oscillator crystal optically is configured to face another end surface of the Q-switch. An output coupler is placed on the output face of the optical parametric oscillator crystal. Such a monoblock laser can improve the brightness and decrease the beam divergence of the monoblock laser.

In one aspect, an exemplary embodiment of a monoblock laser cavity arrangement can be based on an external cavity partial reflector. Such an exemplary arrangement comprises an Nd:YAG gain medium having one coated end surface, a juncture in the medium having a Brewster's angle for polarization, and another end surface; a passive Q-switch having one end surface optically facing said another end surface of the gain medium; an optical parametric oscillator crystal having one end surface and an output face, said one end surface of the optical parametric oscillator crystal optically facing another end surface of the Q-switch, wherein an output coupler is placed on said output face of the optical parametric oscillator crystal; and an external cavity partial reflector having one end surface disposed to optically face said output coupler.

Yet, another exemplary embodiment of a monoblock laser cavity arrangement can be based on a curved-surface external cavity partial reflector. Such an exemplary arrangement comprises an Nd:YAG gain medium having one coated end surface, a juncture in the medium having a Brewster's angle for polarization, and another end surface; a passive Q-switch having one end surface optically facing said another end surface of the gain medium; an optical parametric oscillator crystal having one end surface and an output face, said one end surface of the optical parametric oscillator crystal optically facing another end surface of the Q-switch, wherein an output coupler is placed on said output face of the optical parametric oscillator crystal; and a curved-surface external cavity partial reflector having said curved-surface disposed to optically face said output coupler.

BRIEF DESCRIPTION OF THE DRAWINGS

These and other aspects of the disclosure will become readily apparent in light of the detailed description and the attached drawings, wherein.

DETAILED DESCRIPTION

Figure 1:
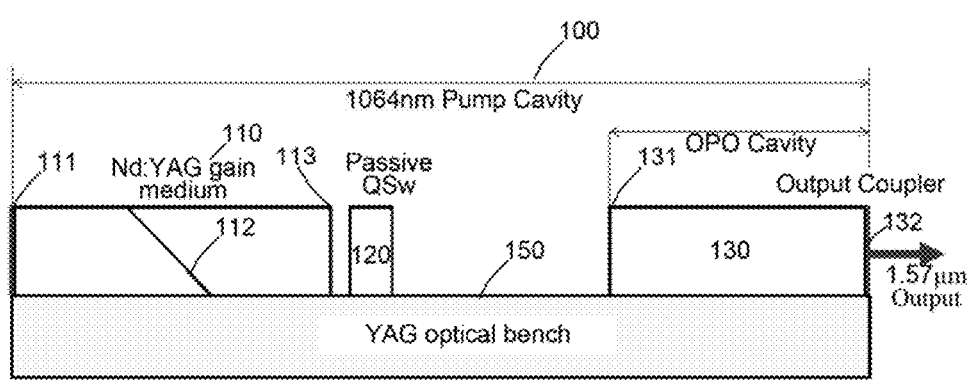
FIG. 1 depicts an exemplary embodiment of a monoblock laser cavity as disclosed.

FIG. 1 depicts an exemplary monoblock laser cavity. It is shown as a flat-flat or stable resonator configuration. As configured in relation to a YAG optical bench 150, an Nd:YAG gain medium 110 has one end surface 111 coated to have a surface optical property, e.g., High-Reflection Coating of HR@1064 nm; and a juncture 112 in the medium 110 having a Brewster's angle for polarization. A passive Q-switch 120 (e.g., Cr4+:YAG passive QSw) has one end surface optically facing another end surface 113 of the Nd:YAG gain medium 110. An optical parametric oscillator (OPO) crystal 130 is configured in relation to another end of the YAG optical bench 150, one end surface 131 of the OPO crystal 130 being optically facing another end surface of the Q-switch 120. The one end surface 131 of the OPO crystal 130 can have surface coatings, e.g., Anti-Reflection Coating of AR@1064 nm, and High-Reflection Coating of HR@1570 nm. Such an exemplary configuration can be acutely sensitive to angular deviations of the mirrors from the optical axis. It can also allow high order modes of lasing to degrade the beam quality.

An ouput coupler 132 can be placed on the output face of the OPO crystal 130. The output coupler 132 can consist of coatings for the OPO cavity 130 as exemplified in FIG. 1. Coatings on the output face of the OPO cavity 130 can therefore serve as the output coupler 132 of the 1064 nm pump cavity as shown in FIG. 1. For example, the output face of the OPO crystal 130 can have High-Reflection Coating of HR@1064 nm, and PR@1570 nm, which serve to function as an output coupler 132. As FIG. 1 also shows, the alignment of the OPO conversion cavity is solely due to the tolerance achieved in the fabrication process of the OPO crystal 130 (how well the face-face parallelism is) since the OPO cavity coatings are processed onto the crystal faces (e.g., 131 and/or 132). This leads to a simple alignment of only the 1064 nm pump cavity of the monoblock 100. The pump cavity can be aligned fairly well in order to produce an appreciable output. In contrast, a malalignment of the OPO cavity 130 can lead to a poor output beam quality.

An Improved Beam Quality of the Monoblock Laser

Figure 2:
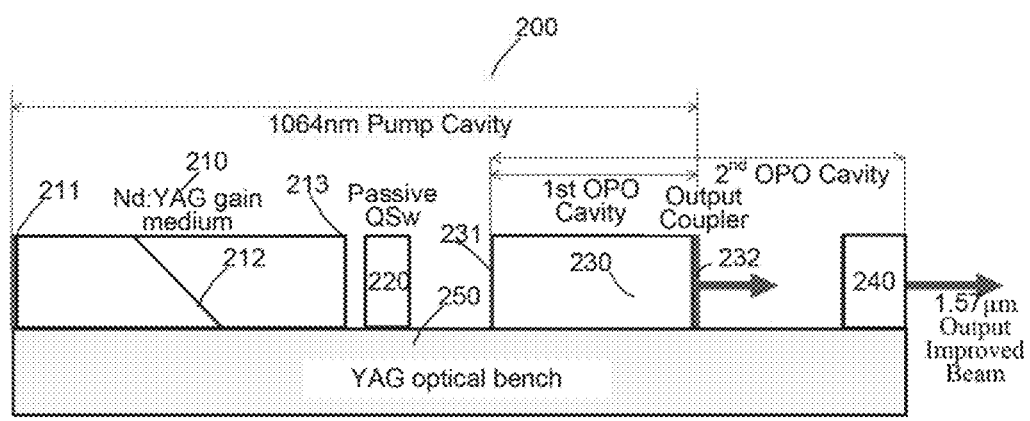
FIG. 2 shows an exemplary embodiment of a monoblock laser cavity arrangement having an external cavity partial reflector for improved beam quality.

FIG. 2 shows an exemplary embodiment of a monoblock laser cavity arrangement 200 having an external cavity partial reflector 240 for improved beam quality. For example, use of an exemplary 1.5 micron external cavity reflector 240 is depicted in FIG. 2. It is comprised of all the same optical components except that a new component, an external cavity partial reflector 240, is added. For example, as configured in relation to a YAG optical bench 250, an Nd:YAG gain medium 210 has one end surface 211 coated to have a surface optical property, e.g., High-Reflection Coating of HR@1064 nm; and a juncture 212 in the medium 210 having a Brewster's angle for polarization. A passive Q-switch 220 (e.g., Cr4+:YAG passive QSw) has one end surface optically facing another end surface 213 of the Nd:YAG gain medium 210. An optical parametric oscillator (OPO) crystal 230 is configured to define a 1$^{st}$ OPO cavity, one end surface 231 of the OPO crystal 230 optically facing another end surface of the Q-switch 220. The one end surface 231 of the OPO crystal 230 can have surface coatings, e.g., Anti-Reflection Coating of AR@1064 nm, and High-Reflection Coating of HR@1570 nm.

As further exemplified in FIG. 2, an output coupler 232 can be placed on the output face of the OPO crystal 230. The output coupler 232 can consist of coatings for the OPO cavity 230 as exemplified in FIG. 2. Coatings on the output face of the OPO cavity 230 can therefore serve as the output coupler 232 of the 1064 nm pump cavity as shown in FIG. 2. For example, the output face of the OPO crystal 230 can have High-Reflection Coating of HR@1064 nm, and PR@1570 nm, which serve to function as an output coupler 232 optically facing the external cavity partial reflector 240 to produce a 1.57 µm output.

One end surface of the external cavity partial reflector 240 facing the output coupler 232 can have a surface coating, e.g., Anti-Reflection Coating of AR@1570 nm. Another end surface of the external cavity partial reflector 240 can a surface coating, e.g., PR@1570 nm to produce 1.57 µm improved beam output. As exemplified, the external cavity partial reflector 240 serves two purposes. First, it lengthens the Optical Parametric Oscillator (OPO) cavity (e.g., from the 1$^{st}$ OPO cavity length to the 2$^{nd}$ OPO cavity length as exemplified in FIG. 2) which lowers the total number of longitudinal modes capable of being supported within the laser resonator. The second, and more important purpose, is that the external cavity partial reflector 240 is aligned to ONLY the back reflector of the OPO resonator.

In contrast, the output coupler 132, which is placed on the output face of the OPO crystal 130 as seen in FIG. 1 (original monoblock laser), is optically aligned with the 1064 nm 'pump' cavity and alignment to the OPO conversion cavity is fixed by crystal fabrication! The output coupler is thus seldom 'perfect' (due to real world fabrication inaccuracies) for both cavities as configured in FIG. 1.

The external cavity partial reflector 240, being optically aligned to only the OPO cavity's back reflector, can optimize the OPO resonator's performance. Optimal performance can be achieved by aligning only to the OPO back reflector and by creating a longer OPO cavity (as seen FIG. 2). This greatly reduces the number of higher order lasing modes generated which leads to a much improved beam quality.

Figure 3:
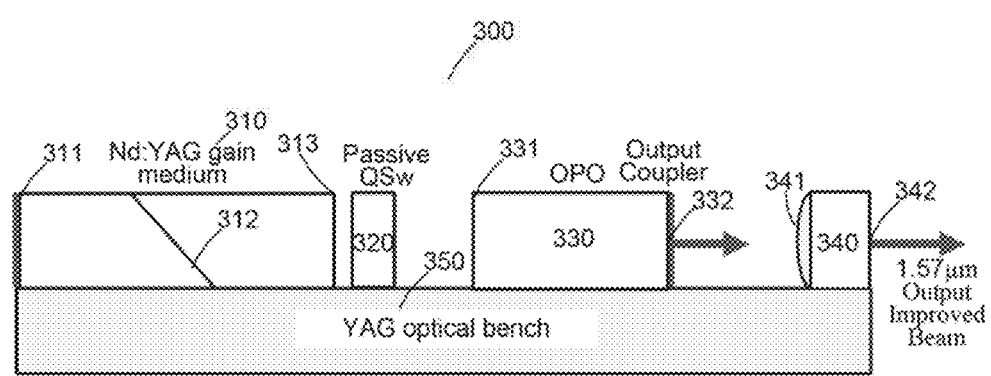
FIG. 3 shows another exemplary embodiment of a monoblock laser cavity arrangement having a curved external partial reflector for improved beam quality.

A Monoblock Laser Cavity Arrangement with a Curved External Partial Reflector for Improved Beam Quality The monoblock laser cavity arrangements discussed above related to a flat-flat cavity. Alternatively, a curved surface 341 can be added to an exemplary external cavity partial reflector as shown in FIG. 3. This will make the cavity an unstable cavity which would make it less sensitive to angular deviations of the mirrors with respect to the optical axis. Such an alternative arrangement can also mitigate the number of modes allowed to propogate within the laser cavity (the higher order mode are subjected to more loss) so the output leaving the laser cavity consists of the lower order modes for a better beam quality.

FIG. 3 shows such an exemplary embodiment of a monoblock laser cavity arrangement 300 having a curved-surface external partial reflector 340 for improved beam quality. Specifically, use of such an exemplary 1.5 micron (or 1.57 µm output) external cavity reflector 340 having a curved surface 341 is depicted in FIG. 3. For example, as configured in relation to a YAG optical bench 350, an Nd:YAG gain medium 310 has one end surface 311 coated to have a surface optical property, e.g., High-Reflection Coating of HR@1064 nm; and a juncture 312 in the medium 310 having a Brewster's angle for polarization. A passive Q-switch 320 (e.g., Cr4+:YAG passive QSw) has one end surface optically facing another end surface 313 of the Nd:YAG gain medium 310. An optical parametric oscillator (OPO) crystal 330 has one end surface 331 of the OPO crystal 330 optically facing another end surface of the Q-switch 320. The one end surface 331 of the OPO crystal 330 can have surface coatings, e.g., Anti-Reflection Coating of AR@1064 nm, and High-Reflection Coating of HR@1570 nm.

As further exemplified in FIG. 3, an ouput coupler 332 can be placed on the output face of the OPO crystal 330. The output coupler 332 can consist of coatings for the OPO cavity 330 as exemplified in FIG. 3. For example, the output face of the OPO crystal 330 can have High-Reflection Coating of HR@1064 nm, and PR@1570 nm, which serve to function as an output coupler 332 optically facing the external cavity partial reflector 340 to produce a 1.57 µm output. The curved end surface 341 of the external cavity partial reflector 340 facing the output coupler 332 can have a surface coating, e.g., PR@1570 nm. Another end surface 342 of the external cavity partial reflector 340 can have a surface coating, e.g., Anti-Reflection Coating of AR@1570 nm to produce a 1.57 µm improved beam output.

The overall output energy of such an alternative exemplary embodiment of the monoblock laser cavity with an external cavity partial reflector may be slightly less than that of the other exemplary embodiments of monoblock laser cavity (how much depends on the amount of 1.5 micron reflection selected for the external cavity partial reflector (from 10% to 80% for typical monoblock laser cavities). But the achievable far field beam divergence can be significantly less to yield an overall increase in the laser's 'brightness'. Accordingly, a smaller afocal can be used in a laser range finder system incorporating such embodiments.

The various embodiments as disclosed can improve the brightness of the monoblock laser (tighter beam divergence). The tighter beam divergence (improved brightness) of the improved monoblock laser allows for use of a smaller diameter optic to collimate the laser output for use in a laser range finder.

The various exemplary embodiments can be small with minimal impact to the monoblock. They can utilize known bonding techniques for monoblock construction.

The monoblock laser with improved beam quality through use of a 1.5 micron external cavity partial reflector is still a simple module that requires none of the labor extensive alignment procedures as alternative laser range finder solid state laser sources. No optical holders have to be fabricated, no complex engineering is required to design the optical cavity, and no precise laser cavity alignment(s) are required. Production labor and material costs are greatly reduced.

The improved monoblock laser cavity is a modular component. The modularity lends to ease of configuration for different pump sources. It can be incorporated in a flash lamp pumped or laser diode pumped system.

The various exemplary embodiments may be used as the laser source in very compact laser range finders. For example, they cant generate eye safe laser output for eye safe laser range finding. These laser range finders can have both military and commercial applications. The compact configuration of the improved monoblock laser cavity also lends itself to placement in other laser-based portable/hand-held devices. These may be medical devices, industrial tools or scientific equipment that would benefit from the size/weight reduction, dependable performance, and low cost.

It is obvious that many modifications and variations of the present invention are possible in light of the above teachings. It is therefore to be understood that within the scope of the appended claims, the invention may be practiced otherwise than as described.

What is claimed is:

1. A monoblock laser cavity arrangement based on a curved-surface external cavity partial reflector, said arrangement comprising:

an Nd:YAG gain medium having one coated end surface, a juncture in the medium having a Brewster's angle for polarization, and another end surface;

a passive Q-switch having one end surface optically facing said another end surface of the gain medium;

an optical parametric oscillator crystal having one end surface and an output face, said one end surface of the optical parametric oscillator crystal optically facing another end surface of the Q-switch, wherein an output coupler is placed on said output face of the optical parametric oscillator crystal; and a curved-surface external cavity partial reflector having said curved-surface disposed to optically face said output coupler.

2. The monoblock laser cavity arrangement according to claim 1, wherein said one coated end surface of said gain medium has a high-reflection coating of HR@1064 nm.

3. The monoblock laser cavity arrangement according to claim 1, wherein said passive Q-switch is a Cr4+:YAG passive Q-switch.

4. The monoblock laser cavity arrangement according to claim 1, comprising a YAG optical bench.

5. The monoblock laser cavity arrangement according to claim 1, wherein the one end surface of the optical parametric oscillator crystal has an anti-reflection coating of AR@1064 nm, and a high-reflection coating of HR@1570 nm, and wherein said output coupler is based on coatings on the output face of the optical parametric oscillator crystal of HR@1064 nm and PR@1570 nm.

6. The monoblock laser cavity arrangement according to claim 1, wherein said curved-surface external cavity partial reflector is a 1.5 micron external cavity reflector having a curved end surface with a surface coating of PR@1570 nm, and another end surface with a surface coating of AR@1570 nm to produce 1.57 μm improved beam output.

* * * * *